United States Patent
Smith

(10) Patent No.: US 7,251,310 B2
(45) Date of Patent: Jul. 31, 2007

(54) METHOD AND APPARATUS FOR DETECTING CONTRABAND USING RADIATED COMPOUND SIGNATURES

(75) Inventor: Richard C. Smith, Pinellas Park, FL (US)

(73) Assignee: L-3 Communications Security and Detection System, Woburn, MA (US)

( * ) Notice: Subject to any disclaimer, the term of this patent is extended or adjusted under 35 U.S.C. 154(b) by 35 days.

(21) Appl. No.: 11/139,194

(22) Filed: May 27, 2005

(65) Prior Publication Data

US 2007/0153974 A1   Jul. 5, 2007

Related U.S. Application Data

(60) Provisional application No. 60/575,106, filed on May 27, 2004.

(51) Int. Cl.
*G01N 23/04* (2006.01)
*G01N 23/22* (2006.01)

(52) U.S. Cl. .................. 378/57; 324/307; 324/309
(58) Field of Classification Search .......... 378/57, 378/63; 324/307, 309
See application file for complete search history.

(56) References Cited

U.S. PATENT DOCUMENTS

| | | | | |
|---|---|---|---|---|
| 5,159,617 A | * | 10/1992 | King et al. | 378/57 |
| 5,168,224 A | * | 12/1992 | Maruizumi et al. | 324/300 |
| 5,182,764 A | | 1/1993 | Peschmann et al. | |
| 5,265,610 A | * | 11/1993 | Darrow et al. | 600/410 |
| 5,600,245 A | * | 2/1997 | Yamamoto et al. | 324/318 |
| 5,642,393 A | * | 6/1997 | Krug et al. | 378/57 |
| 6,088,423 A | * | 7/2000 | Krug et al. | 378/57 |
| 6,194,898 B1 | * | 2/2001 | Magnuson et al. | 324/300 |
| 6,218,943 B1 | * | 4/2001 | Ellenbogen | 340/572.4 |
| 6,591,127 B1 | * | 7/2003 | McKinnon | 600/411 |
| 6,822,444 B2 | * | 11/2004 | Lai | 324/300 |
| 7,023,956 B2 | * | 4/2006 | Heaton et al. | 378/57 |
| 7,049,814 B2 | * | 5/2006 | Mann | 324/300 |
| 2003/0076924 A1 | | 4/2003 | Mario et al. | |

OTHER PUBLICATIONS

International Search Report (11 pages) in PCT/US2005/018845 dated Nov. 29, 2006.

* cited by examiner

*Primary Examiner*—Allen C. Ho
(74) *Attorney, Agent, or Firm*—Wolf, Greenfield, & Sacks, P.C.

(57) ABSTRACT

An system for detecting contraband, particularly explosives or other energetic materials. The system includes a source of ionizing radiation that irradiates an item under inspection. The radiation stimulates the emission of RF energy from objects within the item under inspection. The characteristics of the emitted RF energy reveals information about the material composition of the objects. The system detects this emitted RF energy and comparers it to a signature of RF emissions from contraband objects. Apparatus to detect and analyze RF emissions may be constructed as a stand-alone unit or may be incorporated into an imaging system in which the ionizing radiation is used to form an image of the item under inspection. Similarly, the RF analysis may be used, in the first instance, to determine whether an object contains a contraband item or may be used as a second level analysis to clear alarms generated by analysis of images formed by the imaging system.

21 Claims, 3 Drawing Sheets

METHOD AND APPARATUS FOR DETECTING CONTRABAND USING RADIATED COMPOUND SIGNATURES

RELATED APPLICATIONS

This application claims priority under 35 U.S.C. § 119(e) to U.S. Provisional Application Ser. No. 60/575,106, entitled "METHOD AND APPARATUS FOR DETECTING CONTRABAND USING RADIATED COMPOUND SIGNATURE," filed on May 27, 2004, which is herein incorporated by reference in its entirety.

BACKGROUND OF INVENTION

1. Field of Invention

This invention relates generally to inspection systems and more specifically to inspection systems for detecting contraband items such as explosives.

2. Discussion of Related Art

Inspection systems that can detect contraband items are widely used at airports and other facilities where explosives or other contraband items could be particularly harmful. Many such inspection systems employ ionizing radiation to detect properties internal to items under inspection, thereby allowing the detection of contraband objects concealed within items under inspection.

At present, explosive detection systems for airports predominately use x-ray computed tomography (CT) to analyze the contents of checked airline luggage. CT systems detect explosive materials based on their x-ray absorption parameter values. Often a density map of the item under inspection that is computed from x-ray absorption information is used as an image of the item under inspection. Objects may be identified in the image based on their densities and the identified objects may be analyzed to identify contraband items. However, because the CT system works predominantly on density, innocuous objects having densities similar to the density of a contraband item may produce false alarms from the CT system.

Other detection technologies are known, even if not widely used at airports. These include coherent x-ray scattering, nuclear quadruple resonance (NQR), multi-view dual-energy x-ray, thermal neutron activation, fast neutron activation, and vapor detection.

It has also been proposed to use single view x-ray imaging systems in conjunction with CT based systems to improve the detection accuracy of the overall contraband detection system. The single view system may, for example, provide information about the effective atomic number of objects within an item under inspection. One approach to combining data from a single view and CT system is described in pending U.S. patent application Ser. No. 10/068,459 to Bijjani, et al., titled "METHOD AND APPARATUS FOR TRANSMITTING INFORMATION ABOUT A TARGET OBJECT BETWEEN A PRESCANNER AND A CT SCANNER," filed Feb. 6, 2002, and published as 2003/147489 A1, now U.S. Pat. No. 6,816,571, which is hereby incorporated by reference.

Other systems have been proposed to combine imaging information with other information for improved detection of contraband items. For example, U.S. Pat. No. 5,642,393 to Krug et al., entitled "DETECTING CONTRABAND BY EMPLOYING INTERACTIVE MULTIPROBE TOMOGRAPHY", which is hereby incorporated by reference in its entirety, describes an inspection system that uses more than one inspection technique for an item under inspection.

At present though, only CT-based systems have the required balance of specificity, spatial resolution, processing speed, system size, cost, and the ability to detect the necessary number of explosive types. CT system costs, however, are considered to be relatively high. In addition, CT systems, though certified, often generate false-alarms when the CT system incorrectly identifies that a piece of luggage or other item under inspection contains a contraband item or the CT system identifies that it could not, with a sufficient level of confidence, report that a particular item under inspection does not contain contraband. When a particular bag generates an alarm, significant activity is often required to clear the alarm bag. This activity may require manual inspection of the bag, which can be very costly.

SUMMARY OF INVENTION

In one aspect, the invention relates to a method of detecting contraband, comprising the acts of irradiating an item under inspection with ionizing radiation and detecting RF energy emitted from the item under inspection.

In another aspect, the invention relates to a method of screening an item under inspection. The method involves exposing the item under inspection to ionizing radiation. An image of the item under inspection is formed based on ionizing radiation that has passed through an item under inspection. An analysis of RF radiation emitted from the item under inspection is performed. An assessment of whether the item under inspection contains contraband is made based on the image formed and the analysis performed.

In another aspect, the invention relates to an inspection system adapted to detect contraband in an item under inspection. The inspection system includes a radiation source positioned to emit radiation at an item under inspection. A radiation detector is positioned to detect radiation after it has interacted with the item under inspection. An RF antenna is positioned to receive RF energy emitted by the item under inspection, and a signal analyzer is coupled to the radiation detector and the RF antenna. The signal analyzer has an output adapted to indicate the presence of contraband in the item under inspection based on the image and the received RF energy.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

A new inspection technology, using what is called a "Radiated Compound Signature (RCS) approach" provides an attractive, sensitive, and low-cost method of identifying contraband objects, such as explosives or other energetic materials hidden in airline luggage or other items under inspection. The method is based on detecting radio-frequency (RF) emissions from explosive materials that are being irradiated with ionizing radiation such as x-rays, gamma rays or neutrons.

This baggage examination method is based on radio-frequency (RF) emissions from explosives or other energetic materials that are induced via ionizing radiation (such as x-rays, gamma rays, or neutrons). The RCS approach is very different from the nuclear quadruple resonance (NQR) method. It does not focus externally-generated RF energy onto a threat in expectation of a feeble resonance RF signal in return. Instead, it uses ionizing radiation which, we theorize, induce chemical transitions of individual explosive molecules. Characteristic RF emissions are detected and used to identify types of materials within an item under inspection. The signature is more pronounced for high-energy-content explosive compounds than for low-energy-content, non-threat compounds. The characteristic of the emitted RF radiation provides a basis for identification and discrimination of threat materials.

An RCS-based scanner may serve in a stand-alone configuration or be incorporated with an x-ray system, such as dual energy scanner which would be able to detect potentially interfering metallic shields. It may also serve as a back end to a certified Explosives Detection System (EDS) to resolve false alarms quickly, efficiently, and inexpensively.

While the inventive concepts are illustrated in connection with a baggage inspection system, the invention might be employed in connection with any type of inspection system, such as systems that inspect for weapons, drugs or other contraband that may produce a detectible signature when irradiated.

Figure 1:
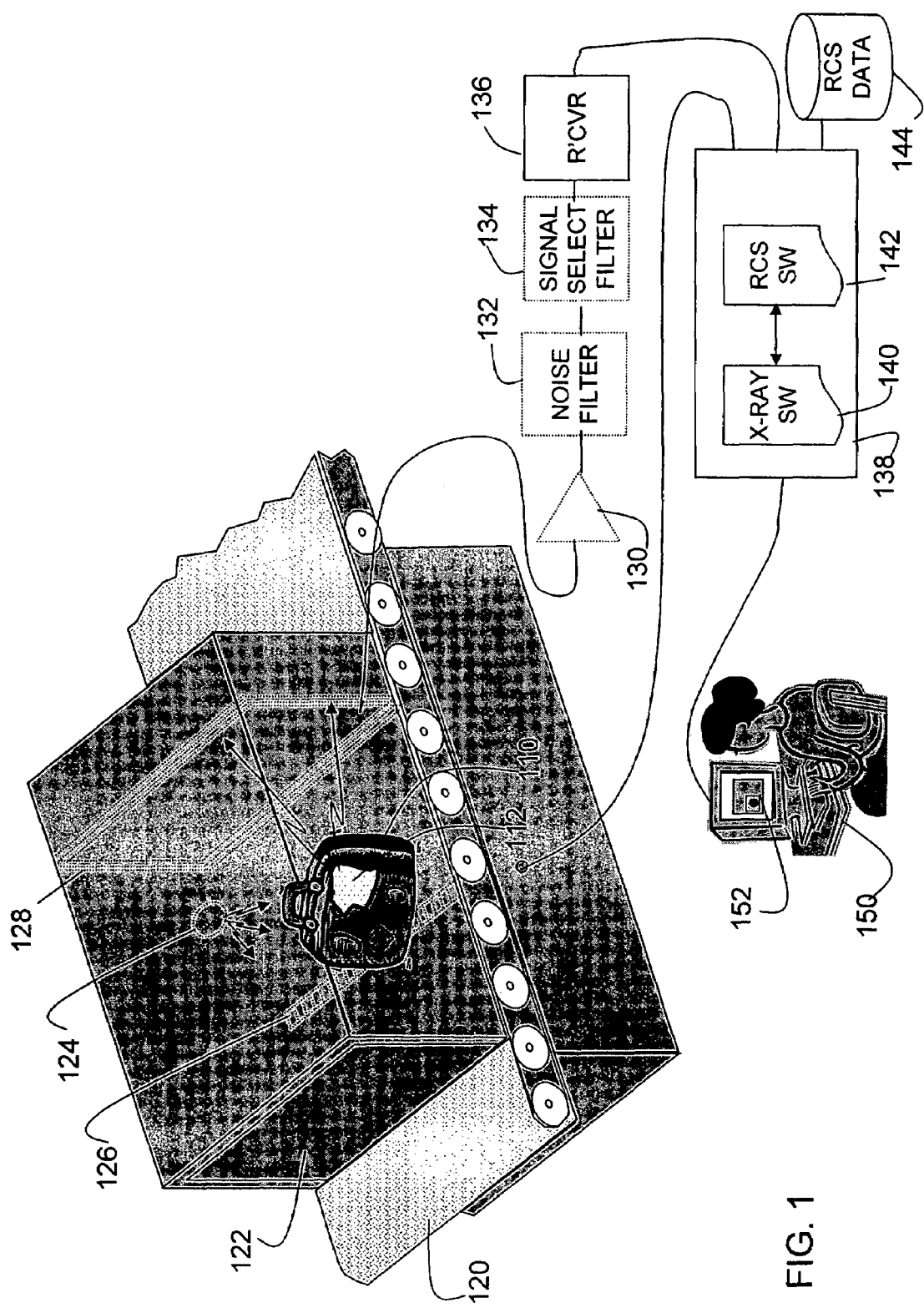
FIG. 1 is a sketch of an inspection system using a radiated compound signature approach.

FIG. 1 shows an inspection system that may be used to inspect items for contraband materials, particularly energetic material, such as explosives. As in the case with NQR, metallic enclosures may provide excessive shielding that prevents RF from being either excited or detected and may be independently detected using an x-ray imaging sub-system. In one preferred embodiment, an RCS sub-system is incorporated into a dual-energy x-ray automated scanner, such as the L-3 Communications Vivid® VIS 108. The x-ray imaging sub-system of the Vivid® VIS 108 can distinguish between metallic and non-metallic objects and may be used to identify metal or other objects that prevent the RCS sub-system from detecting contraband. Shielding material may trigger the system to generate an alarm or cause a different inspection strategy to be applied to a particular item under inspection. Because the Vivid® VIS 108 presently processes bags at 1800 bags/hour, the RCS-based system in this embodiment operates at the same speed.

The inspection system of FIG. 1 includes a conveyor belt 120, as is typical in many inspection systems. Items to be inspected are moved on conveyor belt 120 into a tunnel 122, housing an inspection area. In the illustrated embodiment, the item under inspection is suitcase 110, which is depicted in the inspection area. FIG. 1 depicts an inspection system such as may be used at an airport to screen checked baggage for explosives. However, the application of the inspection system is not a limitation on the invention. Such an inspection system may be used to screen cargo, at security check points outside of airports or in any setting where it is desired to detect contraband, such as explosives.

As in a traditional x-ray inspection system, the item to be inspected passes between a source 124 of ionizing radiation, which in this example is x-rays, and a detector array 126 containing detectors sensitive to that ionizing radiation. Here a detector array 126 is shown below the conveyor 120. The ionizing radiation passing from the source to the detector array passes through the item under inspection. In passing through the item, the radiation is attenuated in an amount that reflects the material properties of the objects within the item under inspection.

In the described embodiment, the x-ray source provides x-rays at multiple energy levels and the detector is sensitive to radiation at least two energy levels. As is known in the art, comparing relative attenuation at different energy levels allows an estimate of the effective atomic number of items in the path of the radiation. Because the effective atomic number can give an indication of the type of materials within the item under inspection, dual energy x-ray systems are often used to identify explosive materials.

However, because attenuation through an item is a function of all objects within that item in the path of the radiation, it is not always possible to identify a particular type of material based on the effective atomic number computed for x-rays projected through the entire item. Identifying explosives using effective atomic number from a single view x-ray system is particularly difficult when the explosive item is thin relative to the overall thickness of the item being inspected.

The inspection system shown in FIG. 1 includes an RCS sub-system with a means to detect RF radiation emitted from objects that are irradiated with the ionizing radiation. The means for detecting RF radiation is shown schematically to include an RF coil 128 that acts as an antenna. An antenna shaped to be sensitive to radiation of the type emitted by explosive objects may be used in some embodiments.

The output of the RF antenna is processed to identify explosives within items under inspection based on characteristics of received RF energy. In the example system shown in FIG. 1, coil 128 is coupled through amplifier 130 through a series of filters to a receiver. Filter 132 is designed to reject noise, which may be present in the system. For example, an x-ray source may emit noise that can interfere with the operation of the receiver. In one embodiment, the noise filter 132 is tuned to reject signals having characteristics of noise generated by the x-ray source.

Filter 134 is designed to selectively pass signals having a characteristic of RF signals emitted by explosives. For example, where characteristics of the RF signal can be predicted, the signal select filter may be a matched filter. Either or both of the noise filter 132 and the signal select filter 134 can be used or omitted.

The filtered signal is passed to receiver 136, which is sensitive to signals in the frequency range of the RF signals emitted by explosives. The receiver preferably converts the RF signals into digital form so that the received signal can be processed by digital circuitry. Circuitry that can amplify, filter and convert to digital form an RF signal is known. Amplifier 130, filters 132, 134 and receiver 136 may be designed using known design techniques or in any other suitable way. In one embodiment, the RF receiver subsystem will have a sensitivity of at least 100 µV/m.

The RF signal processing circuitry may be designed to detect RF signals as generated by an explosive threat object. The RF signals to be detected may be determined theoretically as explained below or based on empirical measurements.

To determine the nature of the RF signal to be detected, the theory of radiated compound signatures may be considered. The energy stored in an explosive's molecular structure is well in excess of the inter-molecular binding energy. Accordingly, the reaction products have a large opportunity to excite a wide variety of quantum energy levels, some of which are believed to decay via RF emission.

TABLE 1

| Explosive | Heat of Combustion | | | Atoms Per Molecule | | | | [Grams/ Molecule] | Energy Released/ Molecule [eV] |
|---|---|---|---|---|---|---|---|---|---|
| | [Cal/gm] | [J/gm] | [eV/gm] | H | C | N | O | | |
| Nitroglycerin | 1631 | 6827 | 4.26E+22 | 5 | 3 | 3 | 9 | 3.77E−22 | 16.1 |
| PETN | 1960 | 8205 | 5.12E+22 | 8 | 5 | 4 | 12 | 5.25E−22 | 26.9 |
| TNT | 3599 | 15065 | 9.40E+22 | 5 | 7 | 3 | 6 | 3.77E−22 | 35.5 |

Table 1 shows examples of the amounts of energy that are typically released per molecule for three explosives. They range from 16.1 eV to 35.5 eV. These are many times larger than the 1 to 2 eV binding energies holding the molecules together in their solid structure. Typically, therefore, molecules have 15 to 30 eV from which to produce a detectable signal.

Equation (1) serves to compute the required RF emission power, $P_t$, to produce a given field strength, E, given a source-to-antenna distance of d. $P_t$ is in watts, E is in volts/meter, and d is in meters.

$$P_t = \frac{E^2 d^2}{30} \quad (1)$$

In an embodiment in which tunnel 122 has an opening cross section of 100 cm×60 cm, an antenna mounted 2 cm above the center of the ceiling would be within 80 cm of every point in an item under inspection, at one time or another, as it passes through on conveyor 120. Accordingly, with an RF receiver sub-system that can detect signals as small as E=100×10$^{-6}$ V/m and d=0.80 m, equation (1) gives a required RF emission power of $P_t$=2.13×10$^{-10}$ watts. This required RF power level is very small in comparison, for example, to the power deposited in an explosive by a typical x-ray source.

The conversion by an explosive material from x-ray energy to RF energy is inefficient. An inspection system as described above will have an RF receiver sub-system that has headroom to cover this inefficiency. X-ray levels as typically used in an x-ray inspection system will pump into the explosive roughly 10$^7$ times the required power and such levels may be used in embodiments of the invention.

One embodiment may include an x-ray source using a tungsten-target x-ray tube running at 160 kV DC and 10 mA. With filtration of 3 mm of aluminum, at a distance of 80 cm the dose rate for an explosive would be in excess of 0.833 rad/sec. Since a rad is 100 erg/gram and since one erg is 10$^{-7}$ joules, the exposure rate translates to (0.833 rad/sec)×(100 erg/gram-rad)×(10$^{-7}$ joule/erg)=8.33×10$^{-6}$ watts/gram. For an explosive of mass 300 grams, the deposited x-ray power is 2.5×10$^{-3}$ watts. This power is in excess of 1 times the required RF emission power. In embodiments requiring less headroom for accurate detection, a weaker x-ray source would be sufficient and may be used.

We theorize that the deposited x-ray energy does not, in itself, generate an RF signal. We believe that the desired signal comes from vibrational or rotational modes of the product molecules. X-rays transmit very little energy to molecules per se. Mainly their energy goes into the planetary electrons via Compton scattering and the photoelectric effect. Disturbing the electron distributions, however, is expected to induce the chemical transitions from which the RF energy may come.

Table 2 summarizes the quantitative comparisons. Only a small RF emission rate of 2.1×10$^{-10}$ watts from an explosive is needed to produce a readily detectable signal of 100 µV/m at the antenna. The x-ray dose itself could easily be 10$^7$ times as big, so the process is not starved for energy. However, each such transition releases a large amount of energy (~25 eV) of which only a miniscule amount is needed to generate a photon of interest (10$^{-6}$ to 10$^{-4}$ eV). Accordingly, detectable RF emissions are produced even though the rate of induced chemical transition is low.

TABLE 2

| | |
|---|---|
| Required RF Field Strength, E | 100 µV/m |
| Required RF Emission Power, $P_t$ | 2.1 × 10$^{-10}$ W |
| Typical X-Ray Dose Rate in 300 g Explosive, D | 2.5 × 10$^{-3}$ W |
| Energy for a 1 cm EM Wave | 1.2 × 10$^{-4}$ eV |
| Energy for a 100 cm EM Wave | 1.2 × 10$^{-6}$ eV |
| Energy Emitted per Explosive Molecule | ~25 eV |

FIG. 1 shows the output of receiver 136 passing to computer 138. Along with the output of the receiver, the output of the detector array 126 used to measure x-rays passing through an item under inspection is also shown as being provided to the same computer 138. In this way, the output of the RCS sub-system and the output of the x-ray imaging sub-system may be fused by data processing within computer 138.

Computer 138 contains computer readable media storing computer-executable instructions that make up x-ray processing software 140 as is traditionally used with single view x-ray systems. It also contains software 142 for processing the RF radiation emitted by items under inspection. In the illustrated embodiment, the computer is connected to a database 144, also implemented on computer-readable media, containing data representing radiated compound signatures of various types of explosives. Comparing detected RF to these signatures allows specific materials in an item to be detected.

In one embodiment, radiated compound signatures in database 144 are determined empirically by observing the nature of the RF emission from explosives. These characteristic signatures of various types of explosives are programmed into an explosive detection system. Received RF emissions can be compared to the stored signatures in database 144 to detect specific types of explosives.

Characteristics of RF emission triggered by shock waves in an explosive material are, for example, described in Paul G. Chambers, Richard J. Lee, Troy Oxby, Warren Perger and Barry Kunz "Electromagnetic Properties of Detonating Explosives," *Bulletin of the American Physical Society,* 12th APS Topical Group Meeting on Shock Compression of Condensed Matter, Atlanta, Ga., June, 2001, vol. 46, no. 4, page 78, 2001. Table 3 lists the parameters of the radiation.

TABLE 3

| Line Number | Frequency [MHz] | Wavelength [cm] | Energy per Photon [eV] |
|---|---|---|---|
| 1 | 100 | 299.7 | 4.14E-07 |
| 2 | 250 | 119.9 | 1.03E-06 |
| 3 | 370 | 81.0 | 1.53E-06 |
| 4 | 430 | 69.7 | 1.78E-06 |
| 5 | 500 | 59.9 | 2.07E-06 |

In the RCS approach, the strongest RF emissions may be at quite different wavelengths than presented in Table 3. Table 3 serves only as an illustration of the characteristics that may be used to detect RF emissions from explosives.

As illustrated, the results of processing the x-ray data and the results of processing the RF radiation are combined to produce an overall assessment of whether an item under inspection contains an explosive. This information is then passed to a review location 150. At review location 150, the information may be processed in one of multiple ways to make an overall threat assessment. In the pictured embodiment, an image formed with the x-ray imaging sub-system is presented on a display 152 for observation by a human operator.

Because the RF signals being detected by the RCS sub-system come from the interaction of the x-ray beam being used to form an x-ray image with the item under inspection, data from the RCS sub-system and the x-ray imaging sub-system may be synchronized. The time at which the signature of an explosive material is detected in the RF signal is correlated with the portion of the item under inspection being imaged at the time that signal is detected. In one embodiment, the information obtained from the RCS sub-system is used to more accurately predict whether regions within the image formed with the x-ray imaging sub-system are explosive. In this embodiment, the display 152 presented to the human operator may appear as in the prior art but with more accurate identification of explosive objects.

Alternatively, the information may be processed by one or more automated threat detection algorithms that classify objects detected from analyzing the image based on multiple properties of those objects, including the size density, and effective atomic number. Such automatic threat detection algorithms could be augmented to include an indication from the RCS sub-system whether the object contains explosive material. Such automatic threat detection algorithms could be used instead of or prior to presentation of an image to a human operator.

Figure 2:
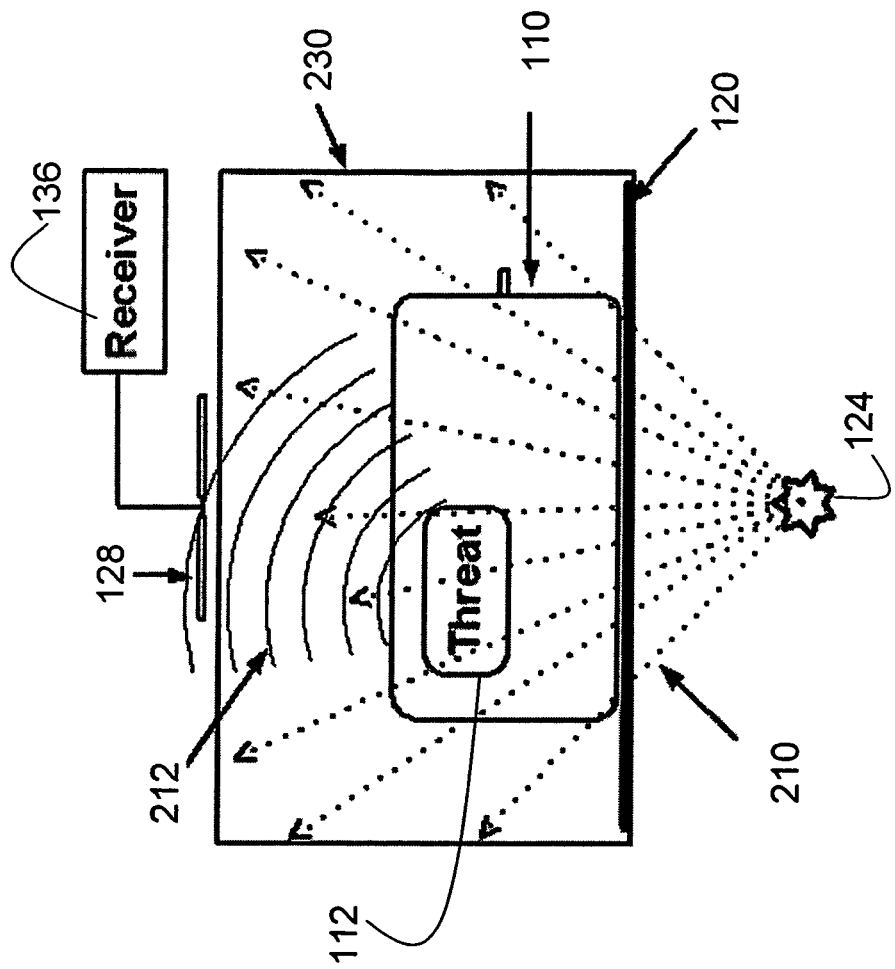
FIG. 2 is a cross-sectional view of the inspection system of FIG. 1.

FIG. 2 is a cross sectional view of the RCS sub-system 230 of an inspection system, which could represent a portion of an inspection system in FIG. 1 or could be a portion of a stand-alone inspection system.

Below the conveyor belt 120 is a radiation source 124 (such as an x-ray source) that illuminates a bag containing an explosive threat 112. The x-rays 210 trigger a minor amount of chemical action in the explosive threat 112, which results in the emission of RF electromagnetic radiation 212. The RF radiation 212 is detected with an antenna 128 and passed by to receiver 136. Spectral and intensity analysis on the detected RF is used to detect the explosive material.

Because the RCS approach identifies explosives via their energetic nature, it is able to differentiate threats from non-threats. Present-day certified systems that are based on x-ray CT detect threats only by density and total object mass. Because many materials share common density values, false alarms for CT systems are quite common. In some embodiments, an RCS sub-system will (i) detect explosives sufficiently reliably to pass TSA certification at or below the 75% threat-mass level, (ii) generate false alarms at a rate many times lower than certification requirements, (iii) perform at a throughput level in the 1800 bags/hour range, and (iv) carry a purchase price substantially less than a present-day certified system. Consequently, the RCS sub-system can be used as a stand-alone inspection system or can be used to "clear" alarms generated by a CT system by determining that no threat material is present in an item under inspection.

An RCS sub-system may be incorporated into a contraband detection system in multiple ways. In one embodiment, the RCS sub-system may be constructed to identify a limited number of explosives that are difficult for other systems to detect. For example, the system may be programmed to recognize the signatures of RDX, PETN and other plastic and sheet explosives. This capability is extremely important. Certified scanners suffer half of their false alarms from sheets. Eliminating this half of the false alarms vastly increases the effective throughput. An RCS sub-system used for alarm resolution both lowers complexity and lowers the cost of eliminating these false alarms.

Figure 3:
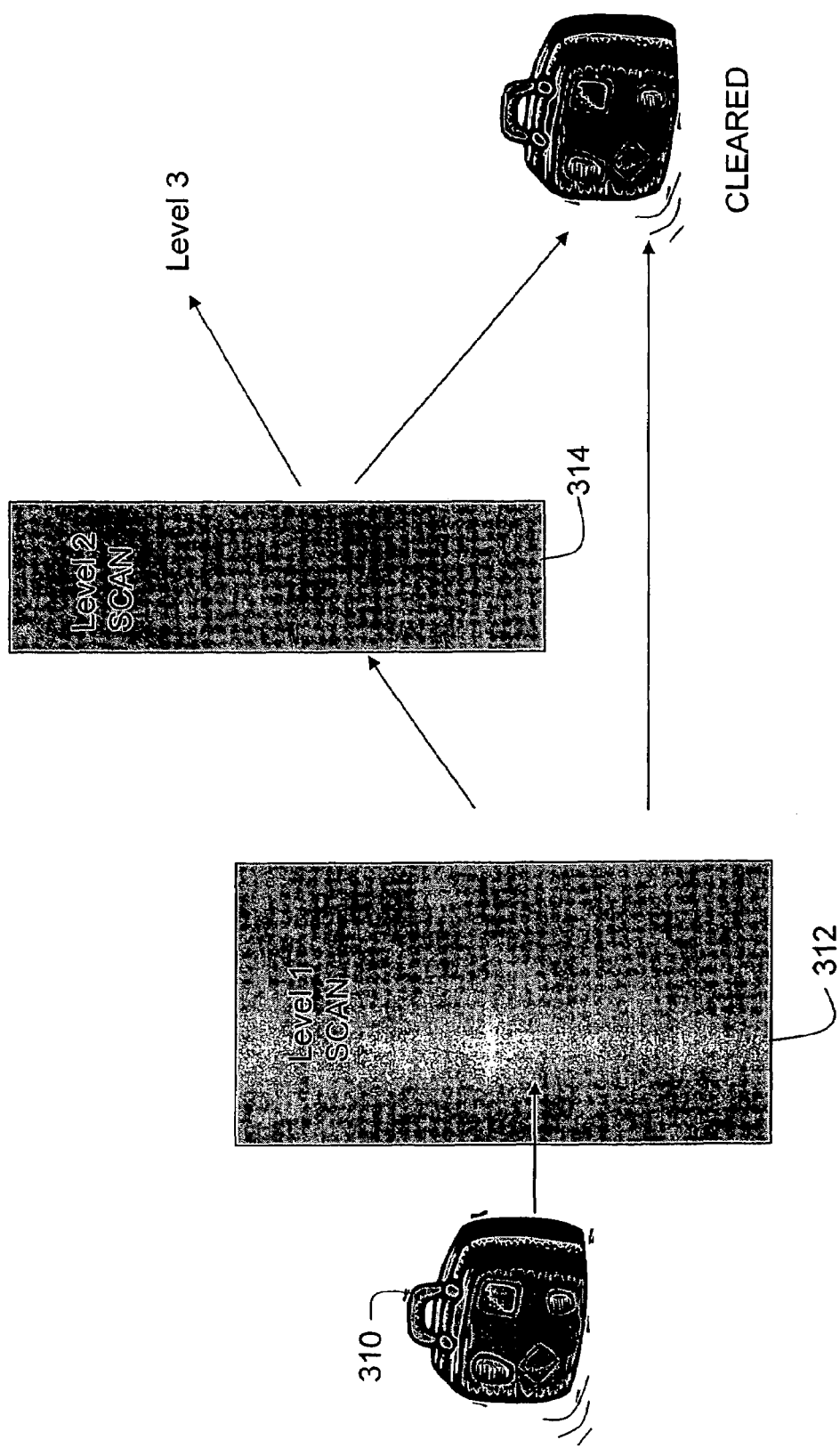
FIG. 3 is a block diagram illustrating the integration of an inspection system employing radiated compound signature approach into a baggage screening operation.

FIG. 3 is an illustration of an RCS sub-system incorporated into a baggage inspection process at an airport as an adjunct to a traditional inspection system. An item under inspection 310 is subjected to a level one scan in a level one scanner 312. Level one scanning may be performed by a single view x-ray system or a CT system. The first level scan may be performed with single or multiple energy levels.

When the first level scan indicates that the item under inspection contains no explosives or other contraband, it may be cleared for loading on an aircraft or for a passenger to carry on the item. Where the first level scan cannot clear an item, the item may be passed to a level two scanner 314. The level two scanner 314 may include an RCS sub-system as described above. Using an RCS sub-system in a level two scan may be appropriate where the first level scan indicates the probability that the item contains explosive material. Where the level two scan can determine that no explosive is contained in the item, the item may then be cleared. Where the level two scan cannot clear the item, the item under inspection may be passed on for a level three inspection, which may include a manual search or other handling of an item consistent with a high probability of containing contraband.

It is not necessary for the RCS sub-system to detect all types of explosives to be useful in a multi-level screening process. If the RCS sub-system can detect only a limited number of explosive materials, e.g., plastics, it may serve as a low-cost means to clear false alarms from a certified CT system. In scenarios in which the RCS sub-system determines that half of the alarms generated by a CT system are false alarms, using the RCS sub-system as a second level scanner would save 50% in costs incurred from manually processing alarm bags and would therefore by highly desirable.

It is not necessary that the level one and level two scanners be physically located close together. Alternatively, it is possible that the level one and level two scanners may be physically packaged in the same unit. For example, the system of FIG. 1 provides the possibility of having a level one scanner and a level two scanner in the same physical unit. The RCS sub-system may serve as either the level one or the level two and the single view inspection system may serve as another level of inspection.

This invention is not limited in its application to the details of construction and the arrangement of components set forth in the foregoing description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art.

For example, the RCS sub-system is shown to be a part of a security system that includes an imaging sub-system. Where an RCS sub-system produces RF signals that are strong and distinct for all contraband items of interest, the RCS sub-system could be used in a stand-alone application to directly detect contraband items. An RCS-based scanner has markedly fewer mechanical and computer components than a CT system and therefore has a lower cost and is less complex. For scenarios in which the RCS sub-system does not respond to certain types of contraband objects, it could serve well as a second tier for alarm resolution, resolving alarmed bags when the bag is alarmed because of a suspicion that it contains contraband of a type the RCS sub-system can detect. Using the RCS sub-system for alarm resolution following a CT system may reduce the overall operating cost of the inspection system because of the reduced need for human intervention to resolve alarms.

For example, it is not necessary that x-ray and RCS processing be performed in the same computer. The data might be processed in any number of computers or special purpose data processing circuits.

As another example, while an x-ray is illustrated, some x-ray sources are too "noisy," a gamma source may be used. For example a $^{60}$Co source may be used.

Such alterations, modifications, and improvements are intended to be part of this disclosure, and are intended to be within the spirit and scope of the invention. Accordingly, the foregoing description and drawings are by way of example only.

What is claimed is:

1. A method of detecting contraband, comprising the acts of:
    a) irradiating an item under inspection with ionizing radiation; and
    b) detecting RF energy induced by the ionizing radiation and emitted from the item under inspection.

2. The method of claim 1, wherein the ionizing radiation comprises at least one of x-rays, gamma rays and neutrons.

3. The method of claim 1, wherein the method additionally comprises the acts of:
    c) comparing the detected RF energy emitted from the item under inspection to a signature of RF energy known to be emitted by contraband; and
    d) indicating the presence of contraband selectively in response to a result of the act of comparing.

4. The method of claim 3, wherein the act c) comprises comparing the detected RF energy emitted from the item under inspection to a signature of RF energy known to be emitted by an explosive.

5. The method of claim 3, wherein the act c) comprises comparing a set comprising at least one characteristic of the detected RF energy emitted from the item under inspection to a set comprising at least one characteristic of RF energy known to be emitted by an explosive, wherein each set comprises at least one of frequency, wavelength and energy per photon.

6. The method of claim 5, wherein the act c) comprises matching a set of at least one measured characteristic of the detected RF energy to a plurality of stored sets, each comprising at least one characteristic of RF energy known to be emitted by an explosive.

7. The method of claim 1, wherein detecting RF radiation emitted from the item under inspection comprises the acts of:
    i) receiving RF radiation with an antenna;
    ii) amplifying an output of the antenna; and
    iii) filtering the amplified output to select detected RF energy in a predetermined frequency range.

8. A method of screening an item under inspection, comprising, the acts of:
    a) exposing the item under inspection to ionizing radiation;
    b) forming an image of the item under inspection based on ionizing radiation that has passed through the item under inspection;
    c) performing analysis of RF radiation induced by the ionizing radiation and emitted from the item under inspection;
    d) making an assessment of whether the item under inspection contains contraband based on the image formed in the act b) and the analysis performed in the act c); and
    e) routing the item under inspection selectively in response to a result of the assessment.

9. The method of claim 8, wherein the act a) comprises exposing the item under inspection to one of x-rays, gamma rays or neutrons.

10. The method of claim 8, wherein the act c) comprises comparing detected RF radiation to a signature of stimulated RF emissions from an energetic material.

11. The method of claim 8, wherein the act c) comprises comparing detected RF radiation to a signature of stimulated RF emissions from an energetic material, the signature comprising at least one of frequency, wavelength and energy per photon.

12. The method of claim 8, wherein the act c) comprises selectively performing analysis of RF radiation emitted from the item under inspection when the image of the item formed in the act b) does not indicate the item under inspection is free of contraband objects.

13. The method of claim 8, wherein the act b) comprises forming an image through computed tomography.

14. The method of claim 13, wherein the act c) comprises determining whether the RF radiation emitted from the item under inspection is characteristic of a plastic explosive.

15. The method of claim 8, wherein:
    the act a) comprises moving the item under inspection past a radiation source;
    the act b) of forming an image comprises sampling an output of a detector array at successive periods of time; and the act d) of performing an analysis comprises correlating measurements of RF energy with the time of a sample of the output of the detector array.

16. An inspection system adapted to detect contraband in an item under inspection, comprising:
   a) a radiation source positioned to emit ionizing radiation at an item under inspection;
   b) a radiation detector positioned to detect radiation after it has interacted with the item under inspection;
   c) an RF antenna positioned to receive RF energy induced by the ionizing radiation and emitted by the item under inspection; and
   d) a signal analyzer coupled to the radiation detector and the RF antenna having an output adapted to indicate the presence of contraband in the item under inspection based on the image and the received RF energy, when the RF energy is characteristic of RF energy induced within the contraband by the ionizing radiation.

17. The inspection system of claim 16, wherein the ionizing radiation source is a source of at least one of x-rays, gamma rays and neutrons.

18. The inspection system of claim 17, additionally comprising:
   e) a conveyor adapted to move the item under inspection through the inspection system; and
   wherein the ionizing radiation source is positioned on a first side of the conveyor and the radiation detector is positioned on a second side of the conveyor.

19. The inspection system of claim 17, wherein the RF antenna is positioned adjacent the ionizing radiation source.

20. The inspection system of claim 17, wherein the RF antenna is positioned in a second level scanner.

21. The inspection system of claim 17, wherein the signal analyzer comprises a computer having computer-readable media associated therewith, the computer-readable media storing a plurality of representations of signatures of energetic materials and a plurality of computer-executable instructions for comparing the received RF energy to the plurality of representations.

* * * * *